June 8, 1926.

S. E. DAVIS 1,588,316

DRAWING DEVICE

Filed May 18, 1925

S. E. Davis —
INVENTOR
BY Victor J. Evans
ATTORNEY

June 8, 1926.

S. E. DAVIS

DRAWING DEVICE

Filed May 18, 1925

S. E. Davis-
INVENTOR

BY Victor J. Evans
ATTORNEY

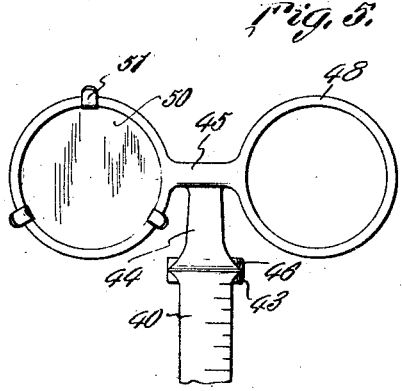
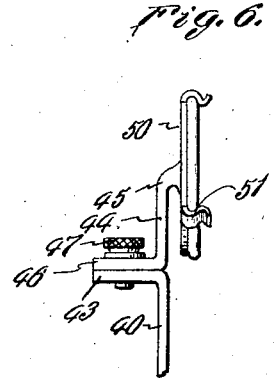
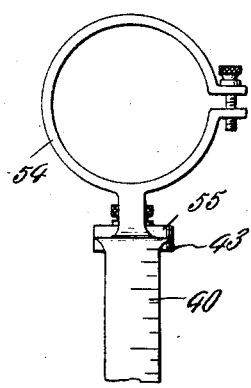
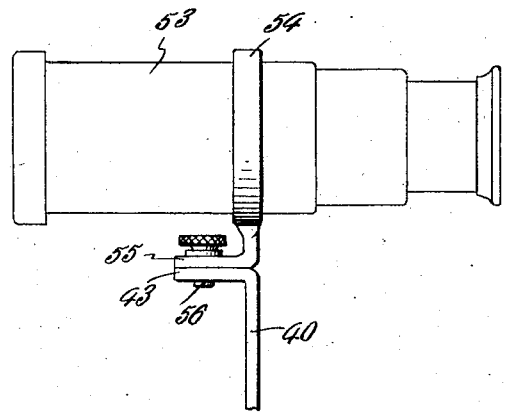
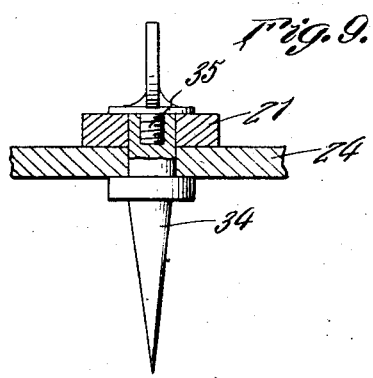
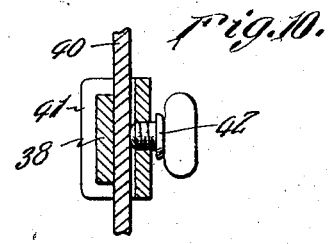

Patented June 8, 1926.

1,588,316

UNITED STATES PATENT OFFICE.

SQUIRE E. DAVIS, OF NEW ALBANY, INDIANA, ASSIGNOR TO MARY I. DAVIS, OF NEW ALBANY, INDIANA.

DRAWING DEVICE.

Application filed May 18, 1925. Serial No. 31,143.

This invention comprehends the provision of a drawing apparatus including a pantograph whereby perfect drawings or sketches with regard to size and relative locations of the various objects or scenery at reasonable distances can be made, without requiring any particular degree of skill on the part of the user, the invention residing in the construction, combination and arrangement of parts as claimed.

In the drawings forming part of this application, like numerals of reference indicate similar parts in the several views, and wherein:

Figure 5 is an enlarged view in elevation of the head support showing one of the eye rims covered with a non-transparent lens.

Figure 6 is a view taken at a right angle to Figure 5.

Figure 7 is a view showing a portion of the head support having associated therewith a clamp for supporting the telescope.

Figure 8 is a view taken at a right angle to Figure 7 showing the telescope arranged in the clamp.

Figure 9 is a sectional view on line 9—9 of Fig. 1.

Figure 10 is a sectional view taken on line 10—10 of Figure 1.

Figure 3:
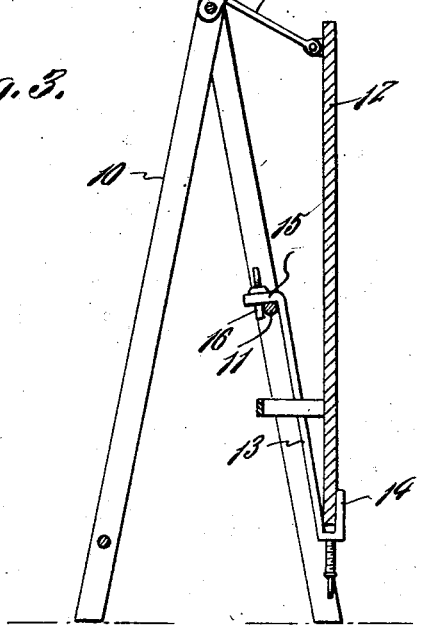
Figure 3 is a sectional view taken on line 3—3 of Figure 1.

The apparatus forming the subject matter of the invention comprises a drawing board support which may be of any suitable construction, but which is preferably in the form of an easel indicated generally at 10 in Figure 3 and including a cross rod 11. The drawing board is indicated at 12 and is adapted to be supported in a true vertical position upon the easel. For this purpose, I preferably employ a pair of spaced bars 13, the corresponding lower extremities of which are formed with hooks 14 to receive the lower edge of the board 12, while the corresponding upper extremities 15 are offset to overlie the transverse rod 11 of the easel, and held associated therewith by means of pins 16 adapted to be arranged behind the rod 11 as clearly shown in Figure 3. In addition to the bars 13, the board 12 is also supported by a rod 17 pivoted at the center and rear of the board adjacent the top thereof and which rod is adapted to slide through a suitable clamp 18 having a thumb screw 19 associated therewith to hold the rod 17 fixed with relation to the easel in any given position. By reason of this construction, the board 12 can be supported in a true vertical position after the easel has been arranged upon the ground or other surface. Rising from one corner of the board is a post 20, and this post supports the pantograph employed with the apparatus.

Figure 2:
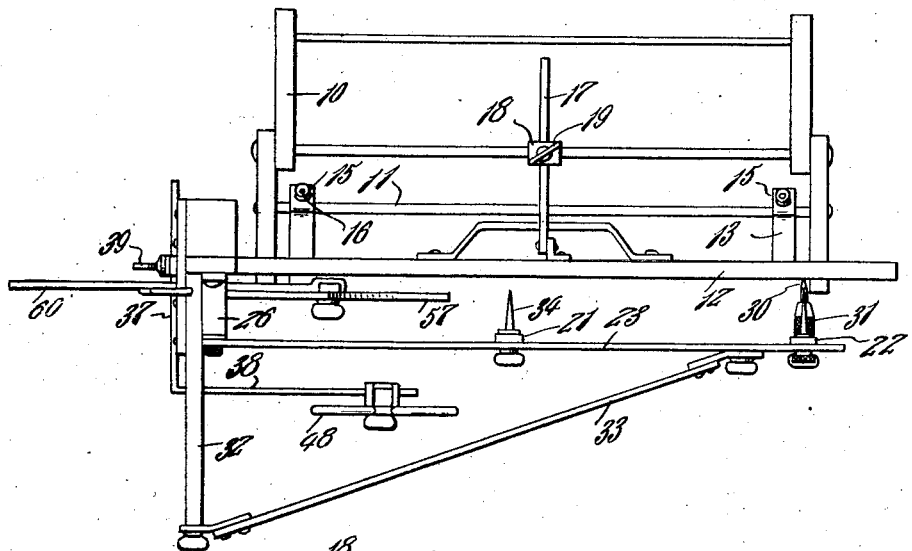
Figure 2 is a top plan view.
Figure 4:
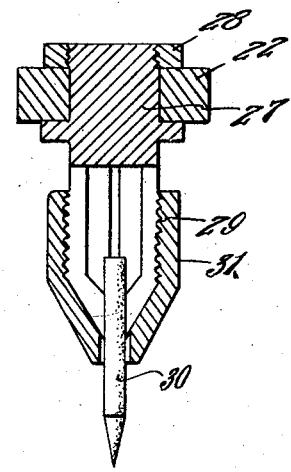
Figure 4 is an enlarged sectional view through the pencil holder.

The pantograph consists of a parallelogram the opposite side members of which are indicated at 21 and 22 respectively, while the opposed end members are indicated at 23 and 24 respectively. All of these members are pivotally connected together at their points of intersection, while the members at diametrically opposed corners are provided with a series of openings 25 whereby the size of the parallelogram can be varied as the occasion may require. The upper end member 23 is comparatively long, in that it is supported on a suitable arm or bracket 26 projecting outwardly from the post 20, while the side member 22 of the pantograph is comparatively long to extend downwardly over the drawing board 12. This member 22 is provided with an opening to receive the body portion 27 of a pencil holder which is held associated with the member 22 by a nut 28. This holder includes a plurality of spaced clamping jaws 29 tapered toward their free ends, and between which the pencil 30 is held when the jaws are arranged and maintained in clamping relation by means of a clamping nut or sleeve 31 adapted to be threaded on the jaws as clearly shown in Figure 4. Also projecting forward from the upper portion of the post 20 is an arm 32 with which and the adjacent end member 23 of the pantograph is connected an obliquely disposed bracing element 33. Carried by the corners of the pantograph, or in other words, at the point of connection between the side member 21 and the end member 24 is what I term the tracing point indicated at 34 in Figures 2 and 9, and this point may be held associated with the pantograph in any suitable manner. It is preferably passed through aligned openings in the members 21 and 24 of the pantograph, and formed with a threaded recess to accommodate a thumb screw 35.

Figure 1:
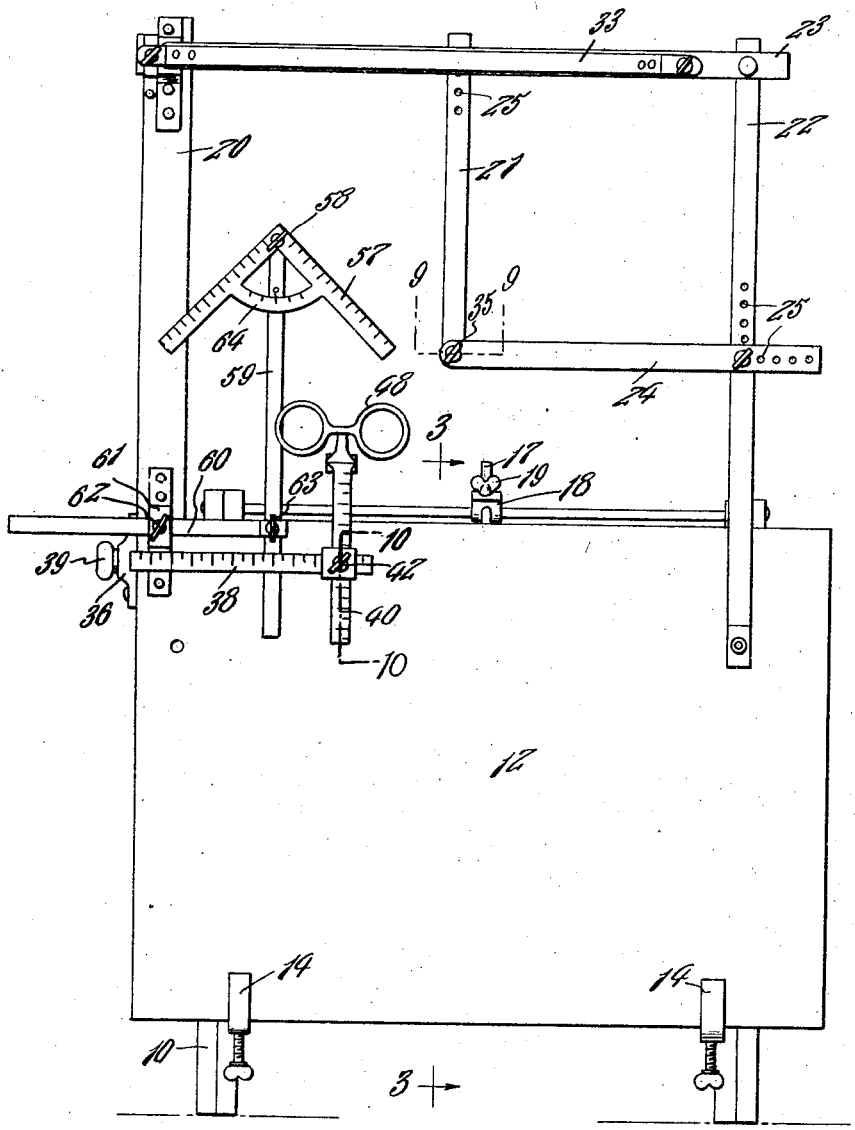
Figure 1 is a view in elevation of the apparatus forming the subject matter of the present invention.

Arranged at one side of the board 12 is a clamp 26 which slidably receives the adjacent branch 37 of a substantially L-shaped bracket arm, the other branch of which is indicated at 38 and adapted to extend transversely and in advance of the drawing board 12 as shown in Figure 1. This bracket arm is graduated and may be adjusted toward and away from the board 12 by means of which adjustment of the size of the object or scenery drawn can be regulated it being of course understood that the branch 38 of this bracket has mounted thereon a head support to be presently described. Associated with the clamp 36 is a thumb screw 39 by means of which the bracket arm just described may be held fixed relatively to the board 12, in a given position.

This head support includes a standard 40 which is graduated as shown in Figure 1, inasmuch as this standard is susceptible of vertical adjustment through a suitable clamp 41 slidably mounted on the branch 38 of the bracket arm above referred to. The clamp has associated therewith a thumb screw 42 by means of which the head support can be held fixed relatively to the bracket in any given position. The upper end of the standard may be used to support different elements as the occasion may require.

In Figures 1, 5 and 6 I have shown a spectacle frame mounted on the upper end of the standard 40, the frame including an extension 44 depending from the nose piece 45 of said frame, and offset at its lower end as at 46 so that it can be bolted or otherwise suitably secured by the fastening element 47 through the adjacent end of the standard 40. The head of the user is adapted to be supported against the frame just described with the rims 48 being utilized to permit the vision to be properly focused on an object or scene to be drawn if it is desired to use one eye in focusing the vision on the said object or scenery, one of the rims 18 of the spectacle frame can be covered by an opaque member 50 having a spring clamp 51 to snap over the particular rim of the frame as clearly shown in Figures 5 and 6. The spectacle frame forms part of the head support, and is used when drawing or sketching objects or scenery at reasonable distances, but if the object or scenery is any great distance away, I contemplate using a telescope indicated generally at 53 in Figure 8, which of course brings the object or scenery closer to the artist. In order to make use of the telescope 53 I employ an annular clamp indicated at 54 which is adapted to be supported upon the upper end of the standard 40 in the same manner as the spectacle frame above described but of course after the frame has been removed from the standard for this purpose. The clamp 53 is formed with an offset extremity 55 which is adapted to repose upon the adjacent extremity 43 of the standard and is associated therewith by suitable fastening elements 56.

The operation or use of the invention thus far described is as follows:

The drawing board 12 is arranged upon the easel in a true vertical position, after which the head support is adjusted either vertically, horizontally, or both with relation to the supporting branch 38 of the L-shaped bracket arm above described, and subsequently held fixed with relation to this arm by means of the set screw 42. The forehead of the artist is supported against the spectacle frame, the object or scenery being sighted through the rims 48, which of course are not provided with lenses. This head support is manifestly adjusted to allow the artist to focus his vision upon the center of that object or portion of scenery desired to be drawn or sketched on the paper or canvas as the occasion may be which is attached to the drawing board 12. After his vision has been thus focused, the pencil 30 is moved across the board, not touching the paper or canvas however, but simply moves to that position on the board where the center of the object or scenery to be drawn will appear. Obviously, as the pencil is moved across the board in a manner and for a purpose just stated, the tracing point 34 is moved into the path of vision, and without moving the head away from its support, and with the eyes focused upon the tracing point 34, the latter is caused to be moved along the outline of the object or scenery to be drawn, with the pencil 30 touching the paper or canvas, whereupon a true and perfect sketch or drawing with regard to the size and relative locations of the various objects or scenery is reproduced on the board. The board of course must be always arranged so that the proper focus may be had on the object or scenery to be drawn through the rims 48 of said frame. The pantograph of course allows the pencil 30 to be moved over the board and at the same time imparts motion to the tracing point which is used to follow the outline of the object or scenery.

When sketching buildings, or any object which requires the drawing of a straight line at any particular angle, I make use of an angle bar indicated at 57 in Figure 1, the apex of which is pivoted as at 58 upon a standard 59 which is mounted for vertical adjustment upon a horizontally disposed bracket arm 60. This arm 60 in turn is also susceptible of horizontal adjustment through a suitable clamp 61 attached to one corner of the board 12, and held in adjusted position by means of a set screw 62 associated with said clamp. A similar element 63 is employed for holding the standard 59 fixed with relation to the bracket arm 60 in a given position. The sides of the angle bar 58 are connected by a segment 64 which together with the sides of the angle bar is graduated as shown in Figure 1. In using the angle bar for the purpose above described, it is arranged directly in advance of the head support, and of course in the path of vision, so that the angle bar can be swung upon its pivot to assume any desired angle with relation to the particular object or outline desired to be drawn. After the angle bar 57 has been properly adjusted to align with the particular line to be drawn, the pantograph is moved to position the tracing point 34 in the path of vision and upon the adjacent edge of the angle bar 57. Consequently a straight line can be made upon the drawing board with the pencil, as the tracing point is moved either downwardly or upwardly along the particular edge of the angle bar 57 with which it is engaged. This angle bar is particularly useful in sketching a roof of a building, but is of course also used for producing straight lines in any desired angle as above stated.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In a drawing apparatus of the character described, a support, a drawing board adapted to be arranged vertically thereon, a post rising from one corner of the board, a head support mounted on said board means whereby said head can be adjusted vertically and horizontally and the vision properly focused upon the object or scene to be drawn, and a parallelogram type pantograph supported on said post and including a pencil holder arranged for movement over the surface of the board, and a tracing point disposed at one corner of the pantograph for movement in the path of vision as and for the purpose specified.

2. In a drawing apparatus of the character described, a support, a drawing board mounted thereon, means for adjusting and holding the board in a true vertical position, a post rising from one corner of the board, a bracket arm extending across the board adjacent the upper edge thereof, a head support mounted on said arm for both vertical and horizontal adjustment, and including a spectacle frame, whereby the vision of the user can be properly focused on the object or scene to be drawn, means for supporting said bracket arm for adjustment toward and away from the board, and a pantograph supported on said post and including a pencil holder supported for movement over the board, and a tracing point disposed normally in the path of vision as and for the purpose specified.

3. In a drawing apparatus of the character described, a support, a drawing board adapted to be arranged and supported in a true vertical position thereon, a post rising from one corner of the board, a bracket arm extending across the board adjacent the upper edge thereof means adjustably supporting said bracket for movement perpendicular to said board, a standard rising from said bracket and supported for both vertical and horizontal adjustment, a focusing device supported on said standard, whereby the vision of the user can be properly focused upon the object or scene to be drawn, a pantograph supported on said post and including a parallelogram structure, a pencil holder supported by one end of one element thereof and arranged for movement over the board, and a tracing point arranged for movement in the path of vision as and for the purpose specified.

4. In a drawing apparatus of the character described, a support, a drawing board adapted to be arranged vertically thereon, a post rising from one corner of the board, a combined head support and focusing device supported for vertical and horizontal adjustment, whereby the vision of the user can be properly focused on the object or scene to be drawn, means supporting said device for adjustment toward and away from the board, a bracket mounted for horizontal adjustment in advance of said board and extending across the board adjacent the upper edge thereof, a standard supported by the bracket for vertical adjustment, an angle bar pivotally supported on the standard and adapted to be arranged in the path of vision for the purpose specified, a pantograph supported on said post and including a pencil holder arranged for movement over the board, and a tracing point arranged for movement in the path of vision and along one edge of said angle bar whereby a straight line at any desired angle may be drawn.

In testimony whereof I affix my signature.

SQUIRE E. DAVIS.